(12) United States Patent
Schenk (10) Patent No.: US 7,095,800 B2
(45) Date of Patent: Aug. 22, 2006

(54) DIGITAL PRECODING FILTER FOR A TRANSMISSION FILTER

(75) Inventor: Heinrich Schenk, München (DE)

(73) Assignee: Infineon Technologies AG, Munich (DE)

( * ) Notice: Subject to any disclaimer, the term of this patent is extended or adjusted under 35 U.S.C. 154(b) by 815 days.

(21) Appl. No.: 10/150,342

(22) Filed: May 17, 2002

(65) Prior Publication Data

US 2003/0067996 A1 Apr. 10, 2003

(30) Foreign Application Priority Data

May 21, 2001 (DE) ................................ 101 24 751

(51) Int. Cl.
*H04L 25/49* (2006.01)
*H04B 15/00* (2006.01)

(52) U.S. Cl. ........................................ 375/296; 375/285

(58) Field of Classification Search ................ 375/295, 375/296, 285, 259, 229–233, 286, 297, 290–293, 375/242–248; 455/91, 114.2, 114.3; 398/192–195, 398/182; 341/56, 50

See application file for complete search history.

(56) References Cited

U.S. PATENT DOCUMENTS

| | | | |
|---|---|---|---|
| 5,093,843 A | | 3/1992 | Hirosaki et al. |
| 5,249,200 A | * | 9/1993 | Chen et al. .................. 375/285 |
| 5,809,033 A | | 9/1998 | Turner et al. |
| 6,167,082 A | * | 12/2000 | Ling et al. .................. 375/233 |
| 6,553,081 B1 | * | 4/2003 | Goodson ..................... 375/296 |
| 6,680,978 B1 | * | 1/2004 | Schneider et al. .......... 375/242 |
| 2003/0035495 A1 | * | 2/2003 | Laamanen et al. .......... 375/296 |

FOREIGN PATENT DOCUMENTS

JP 3889810 7/1994

* cited by examiner

*Primary Examiner*—Tesfaldet Bocure
*Assistant Examiner*—Vineeta S. Panwalker
(74) *Attorney, Agent, or Firm*—Jenkins, Wilson, Taylor & Hunt, P.A.

(57) ABSTRACT

Digital precoding filter for a transmission filter (6) for minimizing the chrest [sic] factor of the signal (y) output by the transmission filter (6), having a modulo adder (22) of the source data symbols which are received from a data symbol source (2) at a signal input (15) of the precoding filter (4), and added with fedback filtered transmission data symbols to transmission output data symbols (p) which are output to the downstream transmission filter (6) via a signal output (41) of the precoding filter (4); and a digital feedback filter (36) which filters the transmission output data symbols present at the signal output (41) and feeds them back to the modulo adder (22), and that [sic] a digital correction filter (39) is connected to the signal output (41), the filter coefficients of the digital correction filter (39) being set as a function of the normalized pulse response of the transmission filter (6) in the case of that sampling phase ($\tau$) for which the output signal of the transmission filter (6) has a maximum value.

12 Claims, 10 Drawing Sheets

DIGITAL PRECODING FILTER FOR A TRANSMISSION FILTER

TECHNICAL FIELD

The invention relates to a digital precoding filter for a transmission filter for minimizing the crest factor of the signal output by the transmission filter.

BACKGROUND ART

Figure 1:
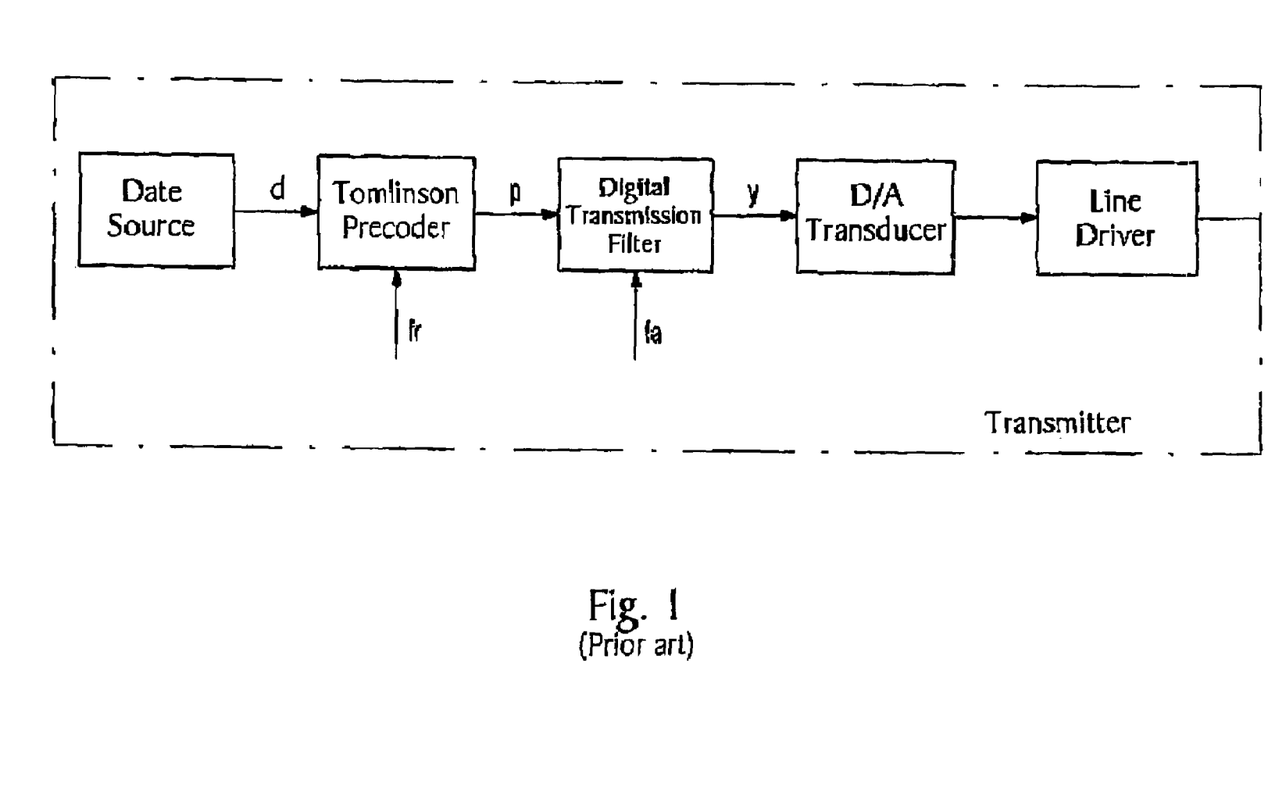
FIG. 1 shows a transmitter according to the prior art.

FIG. 1 shows a transmitter according to the prior art. A data source generates source data symbols which is [sic] output by the data symbol source via a line to what is termed a Tomlinson precoding filter. The Tomlinson precoding filter is generally a non-recursive digital filter whose filter coefficient [sic] are set as a function of the properties of the data transmission line. The Tomlinson precoding filter receives the source data symbols d from the data source with a symbol clock frequency $f_T$. The source data symbols d are generally multi-level symbols and have a number of levels N. The Tomlinson precoding filter processes the received source data symbols d with the symbol clock frequency $f_T$ and outputs output values p to a downstream digital transmission filter. As a result of the Tomlinson precoding filter, the output values of the output signal p lie only within a prescribed value region, and so the peak value is also limited to this overload point of the value range. This has the consequence that the requirements made of the circuitry at the downstream line driver within the transmitter do not become excessively high.

The line driver, which is used in the case of an SDL (symetrical [sic] digital subscriber line), for example, is of complex design in terms of circuitry, since because of the data transmission in upstream and downstream directions in the same frequency band is performed [sic] and there is a consequent need for echo compensation in the receiver. Consequently, the line driver must exhibit a linearity which in part is more than 80 dB. The line amplifier carries out signal amplification of the transmission signal, the transmit power generally being prescribed by the standardization.

The outlay on circuitry for the line driver increases for a prescribed transmit power with an increasing peak valve of the output voltage of the transmission signal. In this case, the crest factor defines the ratio of the peak voltage to the r.m.s. voltage, and is mostly specified in decibels. The crest factor can assume values of up to 10 dB and more, depending on pulse shaping. The crest factor increases with increasing output voltage peak value of the transmission signal, and therefore rises with the magnitude of the dynamic range.

Figure 2:
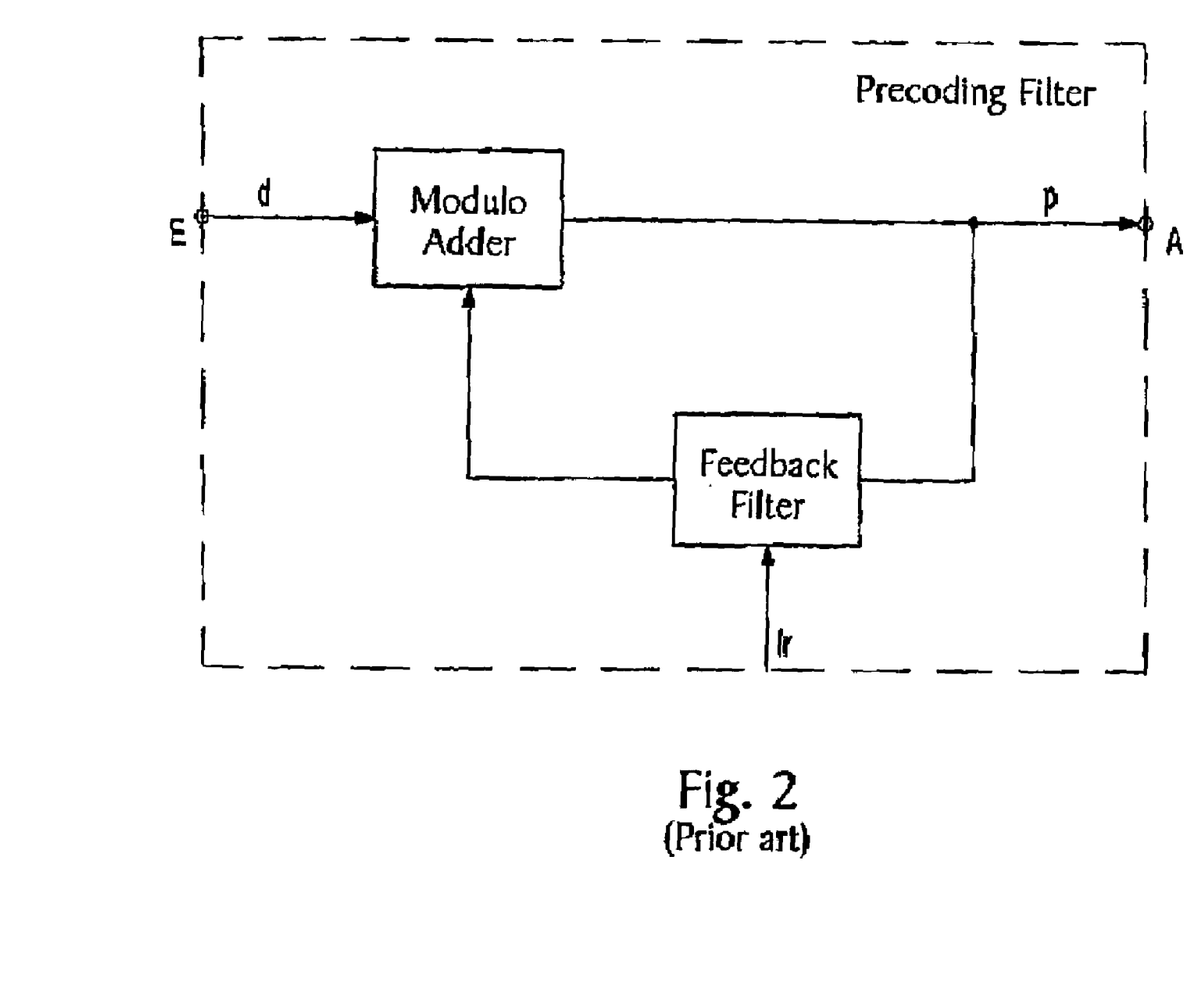
FIG. 2 shows a precoding filter according to the prior art.

FIG. 2 shows a Tomlinson precoding filter according to the prior art, which is installed in the conventional transmitter as it is illustrated in FIG. 1. This conventional Tomlinson precoding filter includes a modulo adder, which adds the source data symbols d, which are received from the data symbol source with the symbol clock frequency $f_T$ at a signal input E of the precoding filter, with fedback filtered transmission data symbols r, which are filtered by a feedback filter, to transmission data symbols p which are output via a signal output A of the Tomlinson precoding filter to the downstream transmission filter. Given a number of levels N for the source data symbols N, the transmission data symbols output by the precoding filter assume the following values:

$$P = \frac{1}{N}\{-(N-1), (N-3) \ldots -1, 1 \ldots (N-3), (N-1)\}$$

In the case of a four-level transmission, for example, the following values are yielded: 0.75, −0.25, 0.25, 0.75.

The modulo addition of the modulo adder is performed as follows:

$$p = d + r \quad \text{if } |d + r| \leq 1$$
$$p = d + r - n.2 \quad \text{if } |d = r| > 1$$
$$p = d + r + n.2 \quad \text{if } |d + r| < -1,$$

n being integral and selected such that the output value p lies only within a dynamic range of −1 to +1.

Figure 3:
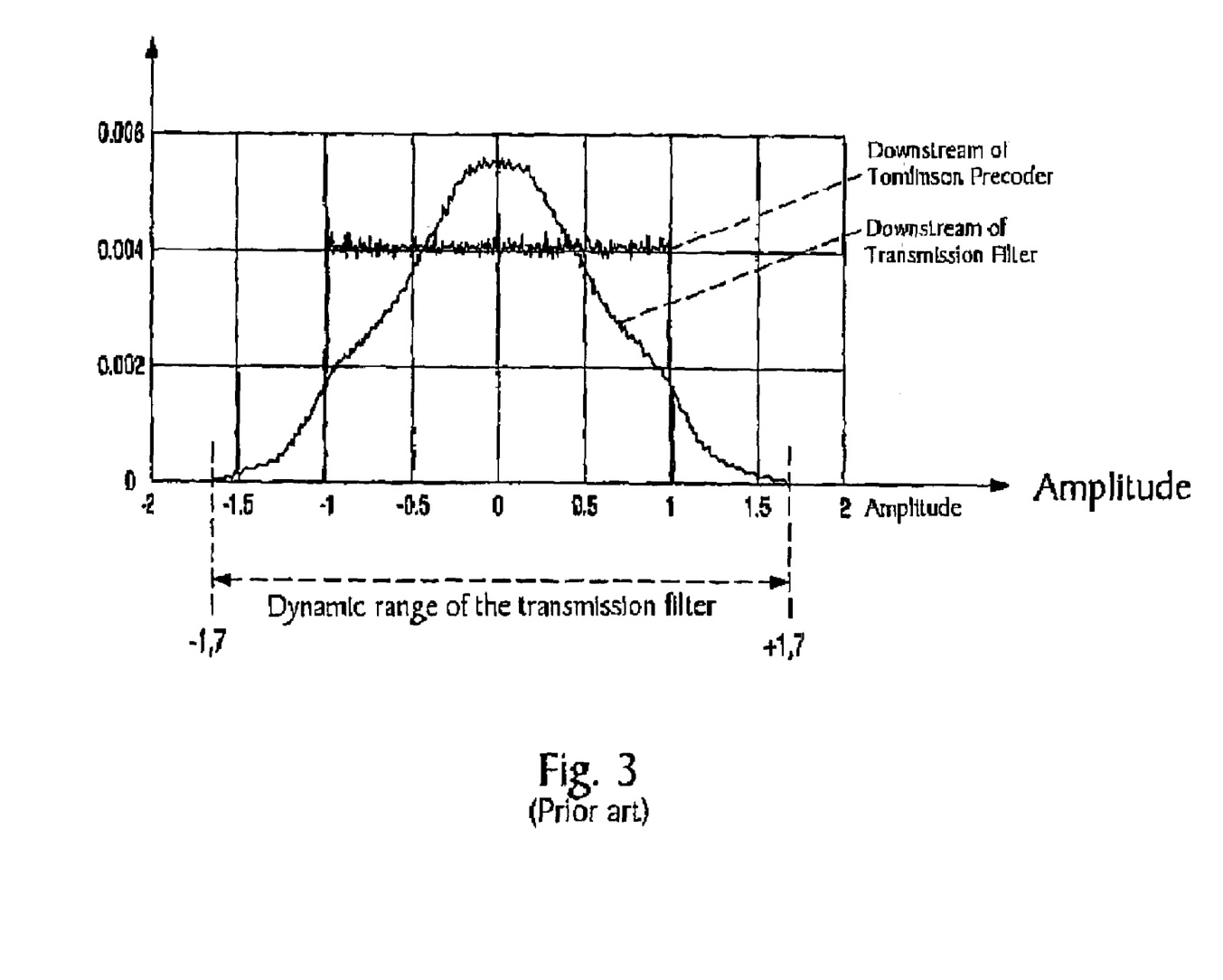
FIG. 3 shows the amplitude distribution downstream of a precoding filter and of a transmission filter in the case of a transmitter according to the prior art.

FIG. 3 shows the amplitude distribution downstream of the Tomlinson precoding filter and of the downstream digital transmission filter in the case of the conventional transmitter as it is illustrated in FIG. 1. The dynamic range of the Tomlinson precoding filter is between −1 and +1, while the dynamic range of the digital transmission filter is between −1.7 and +1.7. The amplitude distribution downstream of the transmission filter, and thus the peak values of the output signal, are relatively high. Owing to the spectral shaping because of the downstream digital transmission filter, the dynamic range and thus the crest factor of the output signal is [sic] relatively high. The circuitry arrangement according to the prior art as it is illustrated in FIG. 2 therefore has the disadvantage that, owing to the high crest factor of the output signal output by the digital transmission filter, the requirements made on the circuitry of the line driver are likewise relatively high.

SUMMARY OF THE INVENTION

It is therefore the object of the present invention to create a digital preceding filter for a transmission filter for the purpose of minimizing the crest factor of the signal output by the transmission filters such that the requirements placed on the circuitry of the line driver of the transmitter are low.

This object is achieved according to the invention by a digital precoding filter with the features specified in Patent claim 1.

The invention creates a digital precoding filter for a transmission filter for minimizing the crest factor of the signal output by the transmission filter, having a modulo adder of the source data symbols which are received from a data symbol source at a signal input of the precoding filter, and added with fedback filtered transmission data symbols to transmission data symbols which are output to the downstream transmission filter via a signal output of the precoding filter, a digital feedback filter which filters the transmission data symbols present at the signal output and feeds them back to the modulo adder, the digital precoding filter having a digital correction filter which is connected to the signal output, the digital precoding filter having an adder which adds the received source data symbols to the signal present at the output of the correction filter, and having a subtracter which subtracts the signal present at the output of the correction filter from the transmission data symbols which are output by the modulo adder.

The filter coefficients of the digital correction filter are preferably set as a function of the pulse response of the transmission filter in the case of that sampling phase for which the output signal of the transmission filter has a maximum value.

Connected downstream of the precoding filter in a preferred embodiment is a transmission filter which comprises a digital transmission filter, a digital-to-analog converter and an analog smoothing filter.

Preferably connected downstream of the transmission filter is a line signal amplifier which transmits the transmission data symbols in an amplified fashion via a transmission line to a receiver.

The source data symbols present at the signal input of the precoding filter are preferably multi-level symbols.

The output signal values of the digital transmission filter preferably lie within a predetermined value range.

The transmission filter is preferably clocked with a sampling frequency which is substantially higher than the symbol clock frequency of the source data symbols.

In a particularly preferred embodiment of the precoding filter, the digital feedback filter and the digital correction filter have a common state memory which comprises a plurality of series-connected delay elements.

In a particularly preferred embodiment, the digital feedback filter is a non-recursive digital filter.

The digital feedback filter is preferably a Tomlinson filter.

In this case, with reference to a particularly preferred embodiment, the filter coefficients of the Tomlinson filter are set by the receiver as a function of the transmission characteristics of the transmission line in an initialization phase.

BRIEF DESCRIPTION OF THE DRAWINGS

A preferred embodiment of the precoding filter according to the invention for a transmission filter is described below with reference to the attached figures in order to explain features essential to the invention. In the drawing.

DETAILED DESCRIPTION OF THE INVENTION

Figure 4:
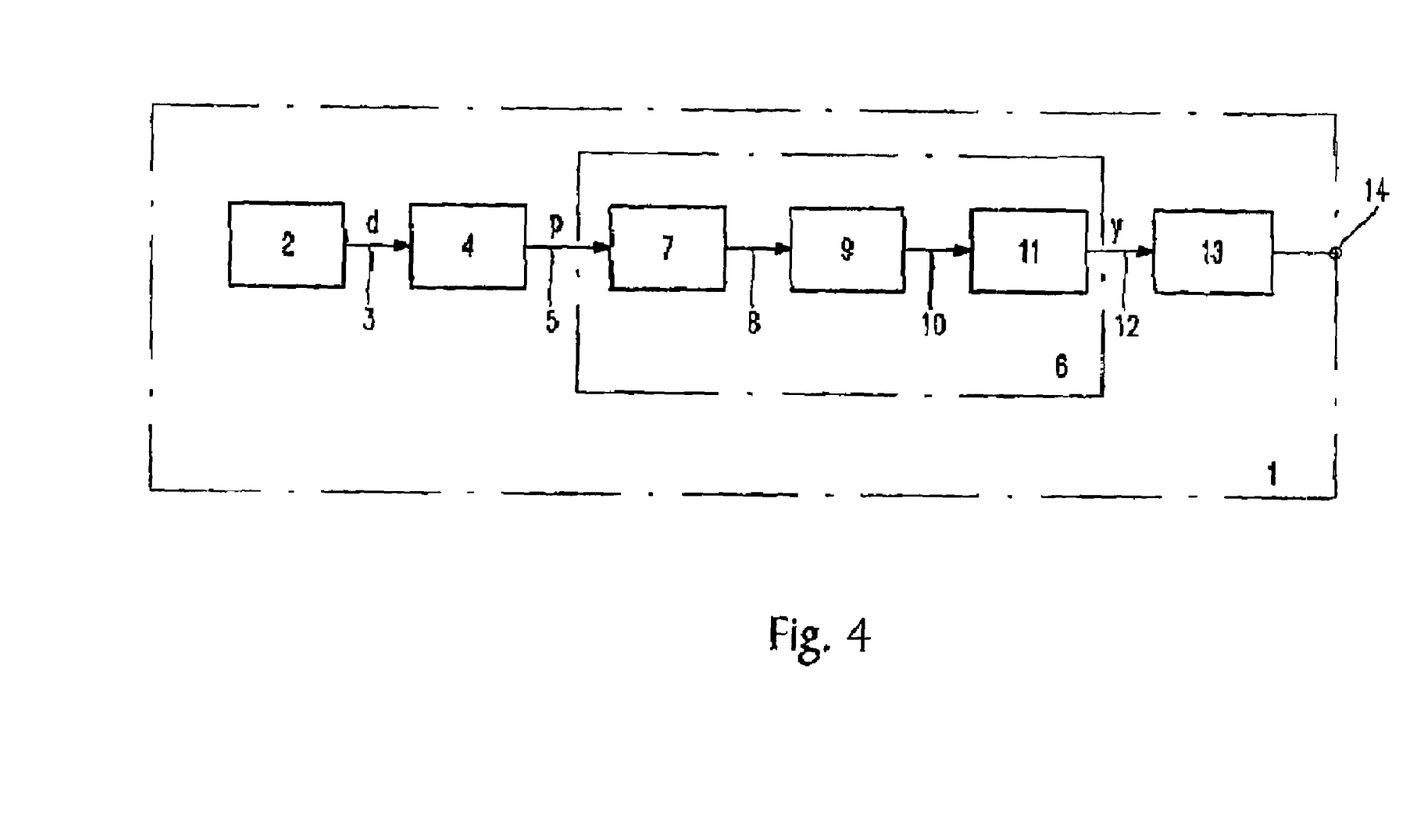
FIG. 4 shows a transmitter which includes the digital precoding filter according to the invention.

FIG. 4 shows a transmitter 1 with a data symbol source 2 which outputs source data symbols d with a symbol clock frequency $f_T$ via a signal line 3 to a digital precoding filter 4 according to the invention, which filters the received data symbols and outputs the filtered transmission data symbols p via a line 5 to a downstream transmission filter 6. The transmission filter 6 preferably includes a digital transmission filter 7 which is connected via a line 8 to a digital-to-analog converter 9, which converts the filtered data symbols into an analog signal. An analog smoothing filter 11 is connected downstream of the digital-to-analog converter 9 via a line 10. The analog smoothing filter 11 is connected on the output side via a line 12 to a line driver 13 whose output 14 forms the output of the transmitter 1 and is connected via a transmission line to a receiver (not illustrated).

The source data symbols d are output by the data symbol source 2 with the symbol clock frequency $f_T$. The precoding filter 4 processes the received source data symbols d with the same symbol clock, and outputs its output values p via the line 5 to the downstream digital transmission filter 7 inside the transmission filter 6. The transmission filter 6 operates with the sampling clock $f_a$ of the digital-to-analog converter 9. In this case, the sampling frequency $f_T$ is selected in such a way that the sampling theorem for the transmission signal is not infringed. The sampling frequency $f_a$ is therefore always substantially higher than the symbol rate $f_T$ of the received source data symbols d.

Figure 5:
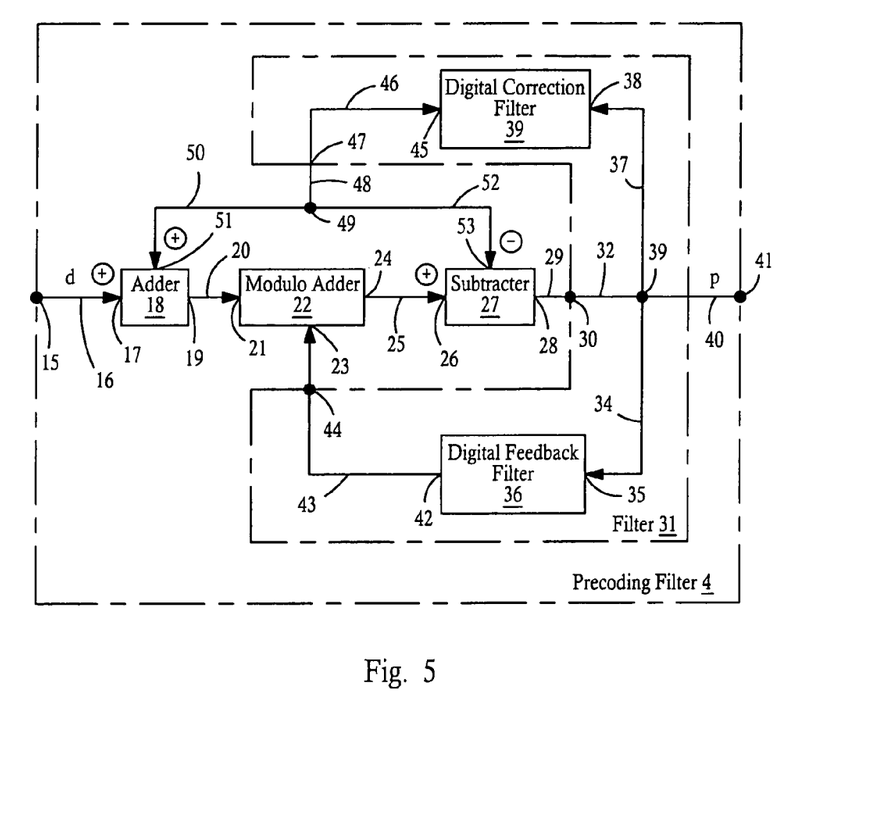
FIG. 5 shows a preferred embodiment of the digital precoding filter according to the invention.

FIG. 5 shows a preferred embodiment of the digital precoding filter 4 according to the invention inside the transmitter 1. The precoding filter 4 has a signal input 15 which is connected via a line 16 to a first input 17 of an adder 18. The adder 18 has an output 19 which is connected via a line 20 to an input 21 of a modulo adder 22. The modulo adder 22 has a further signal input 22 and a signal output 24 via which the modulo adder 22 is connected via a line 25 to an input 26 of a subtracter 27. The subtracter 27 has an output 28, which is connected via a line 29 to an input 30 of a filter 31 inside the precoding filter 4. The input 30 of the filter 31 is connected via a line 32 to a branching node 33 which is connected via a feedback line 34 to an input 35 of a digital feedback filter 36, and via a feedback line 37 to a signal input 38 of a digital correction filter 39. The branching node 33 is also connected via a line 40 to a signal output 41 of the digital precoding filter 4. The feedback filter 36 has a signal output 42 which is connected via a line 43 to an output 44 of the filter 31. The correction filter 39 also has an output 45, which is connected via a line 46 to a further output 47 of the filter 31. The output 47 of the filter 31 is connected via a line 48 to a branching node 49 which is connected via a line 50 to a further input 51 of the adder 18, and via a line 52 to a further input 53 of the subtracter 27.

The modulo adder 22 adds the source data symbols d present at the input 15 with the fedback filtered transmission data symbols r to transmission data symbols p. The transmission data symbols p are fed back, filtered by the feedback filter 36, to the input 23 of the modulo adder 22. The feedback filter 36 is preferably a non-recursive filter, in particular a Tomlinson filter. The filter coefficients of the feedback filter 36 are set in a starting or initialization phase as a function of the transmission line connected at the signal output of the transmitter 1. In this case, the line characteristics of the transmission line are determined during the starting phase by the receiver connected at the other end of the transmission line, and transmitted to the transmitter. The transmitter 1 sets the filter coefficients of the feedback filter 36 permanently as a function of the transmitted transmission characteristics of the transmission line.

The modulo adder 22 carries out a modulo addition as described in conjunction with the prior art.

The digital correction filter 39 filters the signal present at the signal output 41 of the preceding filter 1, and forms a correction variable which, on the one hand, is added by the adder 18 to the received data signal before the modulo operation and, on the other hand, is subtracted by the subtracter 27 after the modulo operation has been carried out. As a result, the amplitude peak value of the signal output by the downstream transmission filter 6 is minimal in conjunction with a constant signal power. The correction filter 39 likewise operates with the symbol rate $f_T$ at which the source data symbols d are received from the data symbol source 2 by the preceding filter 4.

The filter coefficients of the digital correction filter 39 can be set as a function of the pulse response h(t) of the downstream transmission filter 6. The transmission filter comprises the digital transmission filter 7, the digital-to-analog converter 9 and a smoothing filter 11. The transmission filter 6 therefore has a time-continuous pulse response h(t).

If the transmission filter 6 is excited in temporarily constant intervals T with the values X, a time-continuous time signal of the form:

$$y(t) = \sum_{iM0}^{\infty} x_i h(t - i \cdot T) \quad (1)$$

results at its output.

In order to determine the pulse response g(k) of the digital correction filter 39, the first step is to determine the most unfavorable sampling phase of the transmission filter, than is to say the sampling phase for which the output signal of the transmission filter 6 has a maximum value.

This sampling phase can be determined as follows:

$$|y(t)|_{max} = \sum_{i=0}^{\infty} |h(t - i \cdot T)| \, 0 \leq i \leq T \quad (2)$$

After the determination of the most unfavorable sampling phase τ, the values of the sampled pulse response of the transmission filter 6 are obtained as follows:

h(τ), h(T+τ), h(2×T+τ) (3)

The pulse response values obtained in such a way are normalized for the purpose of calculating the filter coefficients of the correction filter 39, by dividing the values by the maximum pulse response value.

Figure 6:
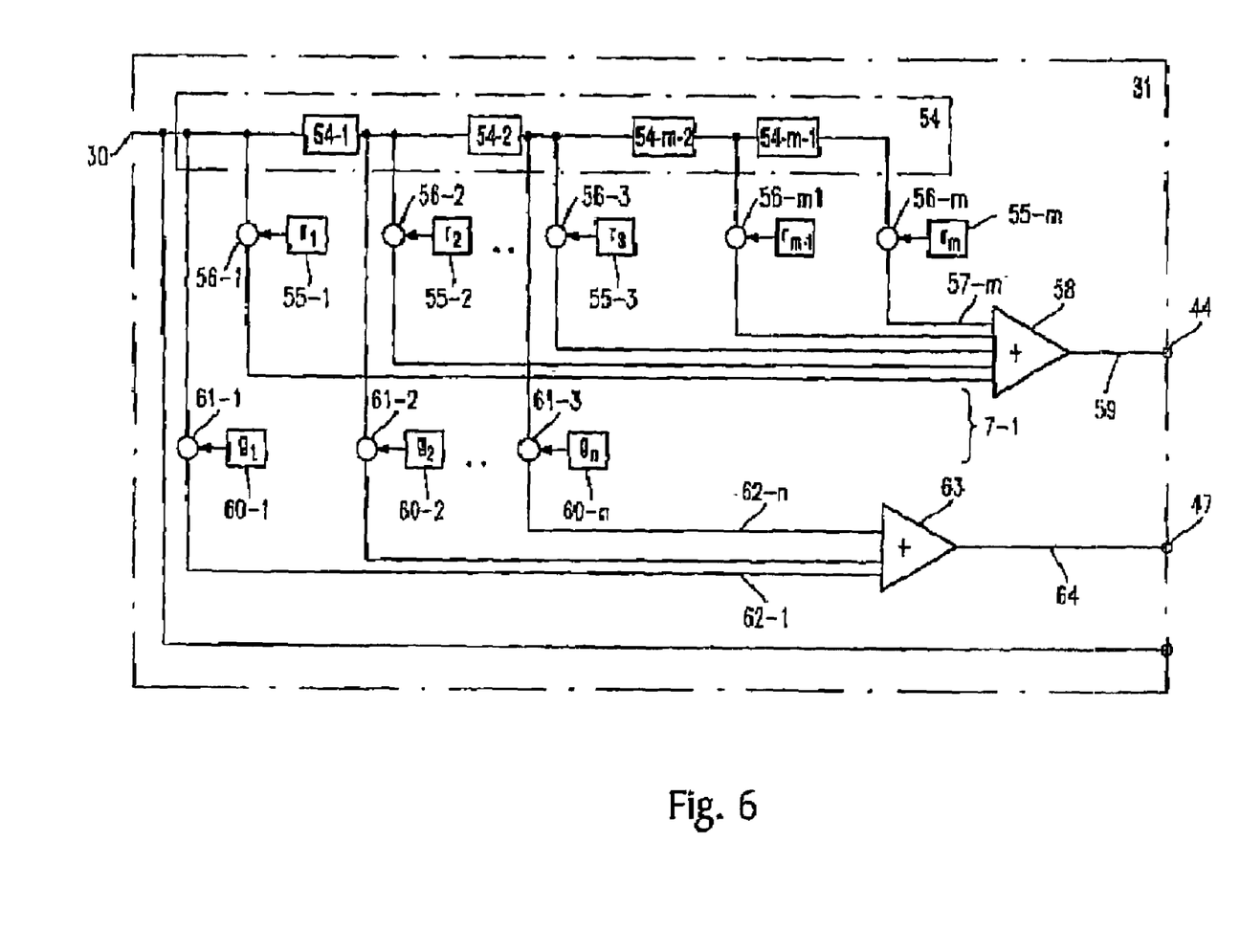
FIG. 6 shows a preferred embodiment of the correction filter and of the feedback filter inside a digital precoding filter according to the invention.

FIG. 6 shows a preferred embodiment of the filter 31 inside the precoding filter 4 according to the invention. Since the feedback filter 36 and the correction filter 39 receive the same input signal via the signal input 30, in the case of the embodiment illustrated in FIG. 6 there is provided for both filters 36, 39 a common state memory 54 which comprises a plurality of series-connected delay elements 54-1, 54-2 . . . 54-M. The filter coefficients $r_i$ of the feedback filter are stored in a memory 55-1, 55-2 . . . 55-M, and are multiplied by means of multipliers 56 by the output signals of the state memory 54. The multipliers 56 are connected via lines 57 to an adder 58 which adds up the signals and outputs them via a line 59 to the output 44 of the filter 31.

The filter coefficients g1, g2 . . . gn of the correction filter are stored in a memory 60 and are multiplied by the output signals of the state memory 54 by means of multipliers 61. The multipliers 61 are connected via line 62 to an adder 63 which adds the signals and which is connected on the output side via a line 64 to the further output 47 of the filter 31. The outlay on circuitry for the filter 31 can be minimized because of the common state memory 54.

Figure 7:
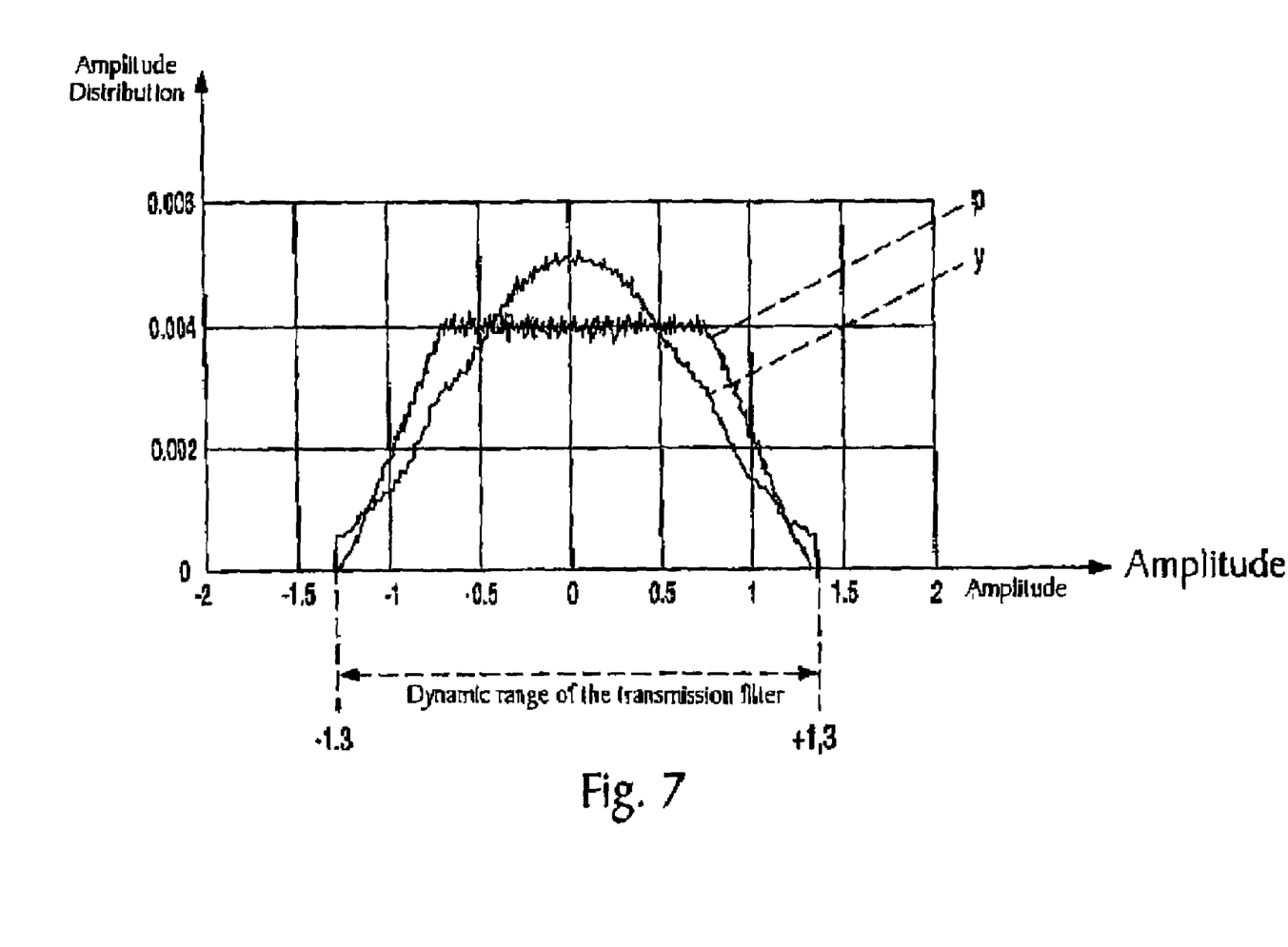
FIG. 7 shows the amplitude distribution in a precoding filter according to the invention, and in a downstream transmission filter.

FIG. 7 shows the amplitude distribution in the case of the precoding filter 4 according to the invention and of the transmission filter 6 inside the transmitter 1. The amplitude distribution of the output values p at the output p of the precoding filter 4 expands (by comparison with the case illustrated in FIG. 3) to a range of +/−1.3. For this purpose, the dynamic range of the output signal y at the output of the transmission filter 6 is reduced from +/−1.7 to +/−1.3. Reducing the dynamic range of the transmission filter 6 by means of the precoding filter 4 according to the invention has the effect of reducing the crest factor of the output signal y, and thus of diminishing the requirements on the circuitry of the downstream line driver 13. The line driver 13 can be designed for a smaller voltage level difference in conjunction with a correspondingly higher current, such that the transmit power prescribed in the standard remains constant. The magnitude of the reduction in the crest factor is a function of the pulse response h(t) of the transmission filter 6.

Figure 8:
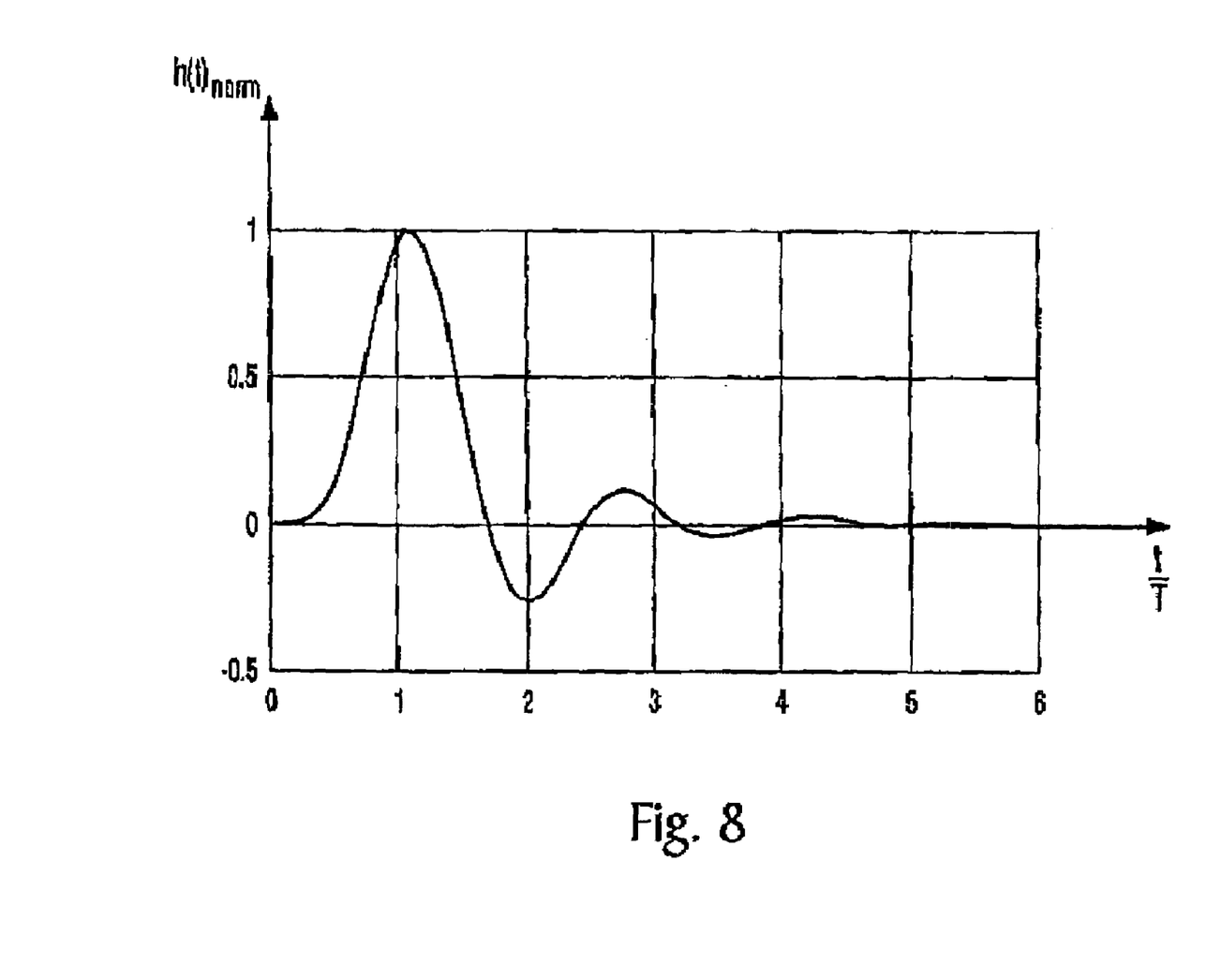
FIG. 8 shows the pulse response of a transmission filter, connected downstream of the precoding filter according to the invention, for determining the filter coefficients of the digital correction filter.

FIG. 8 shows an example of a pulse response h (t) of the transmission filter 6.

Figure 9:
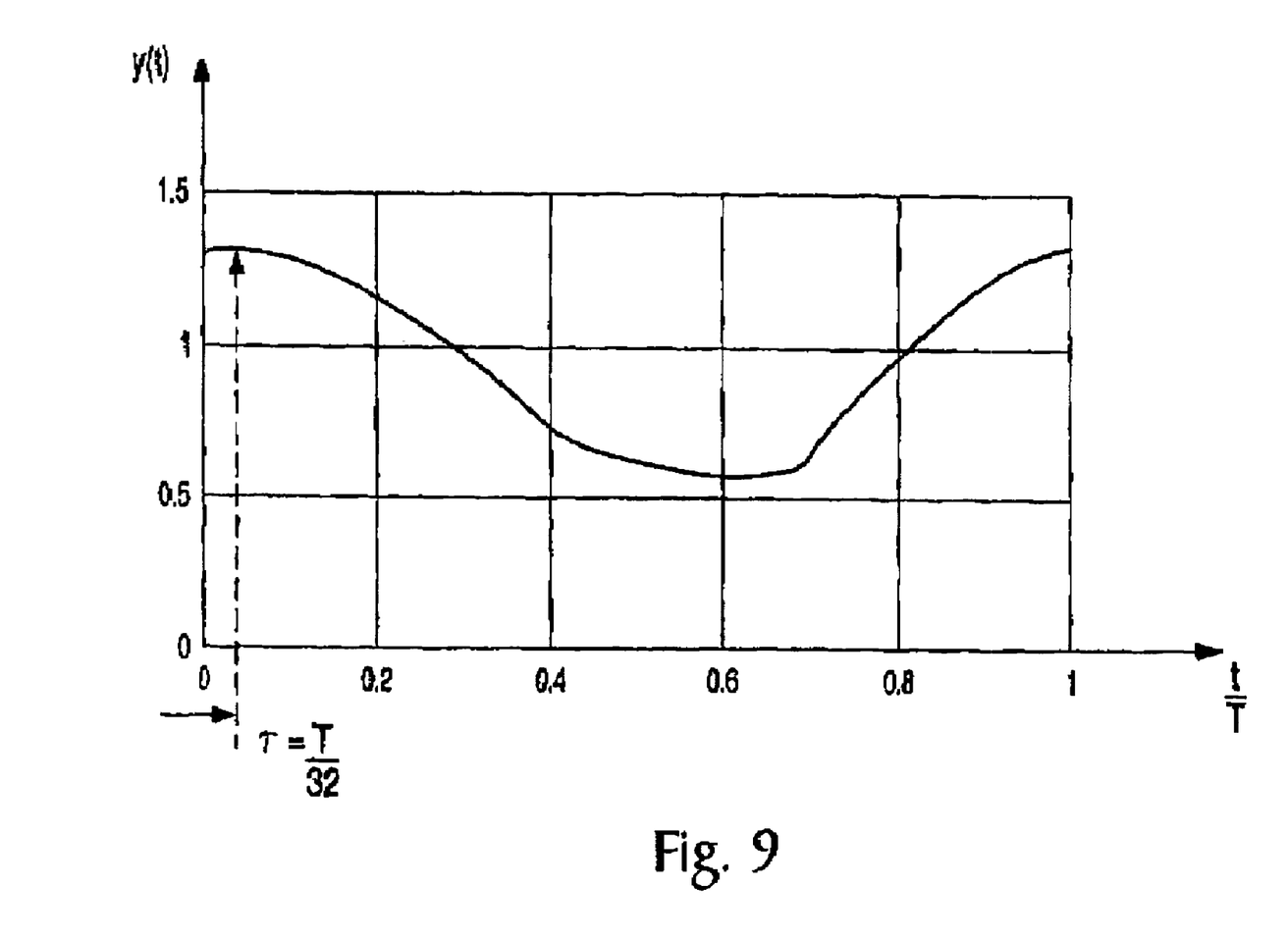
FIG. 9 shows the maximum values at the signal output of the transmission filter with the pulse response, illustrated in FIG. 8, for determining the filter coefficients of the digital correction filter inside the digital precoding filter according to the invention.

Equation (2) is used to calculate from the pulse response h(t) a maximum value at the output of the transmission filter 6 upon excitation by signals with an amplitude <1. FIG. 9 shows the upper bound for the maximum value of the output signal at the output of the transmission filter 6. Selected as the most unfavorable sampling phase is that sampling instant in the time range 0≦t<T for which the absolute value of the output signal is a maximum. This most unfavorable sampling instant is the instant T/32 in the case of the example illustrated in FIG. 9.

In order to determine the filter coefficients g(k) of the correction filter 39, the samples are extracted from a pulse response, normalized to the maximum value, of the transmission filter in time intervals of k×T in the case of the above-determined most unfavorable sampling phase τ.

Figure 10:
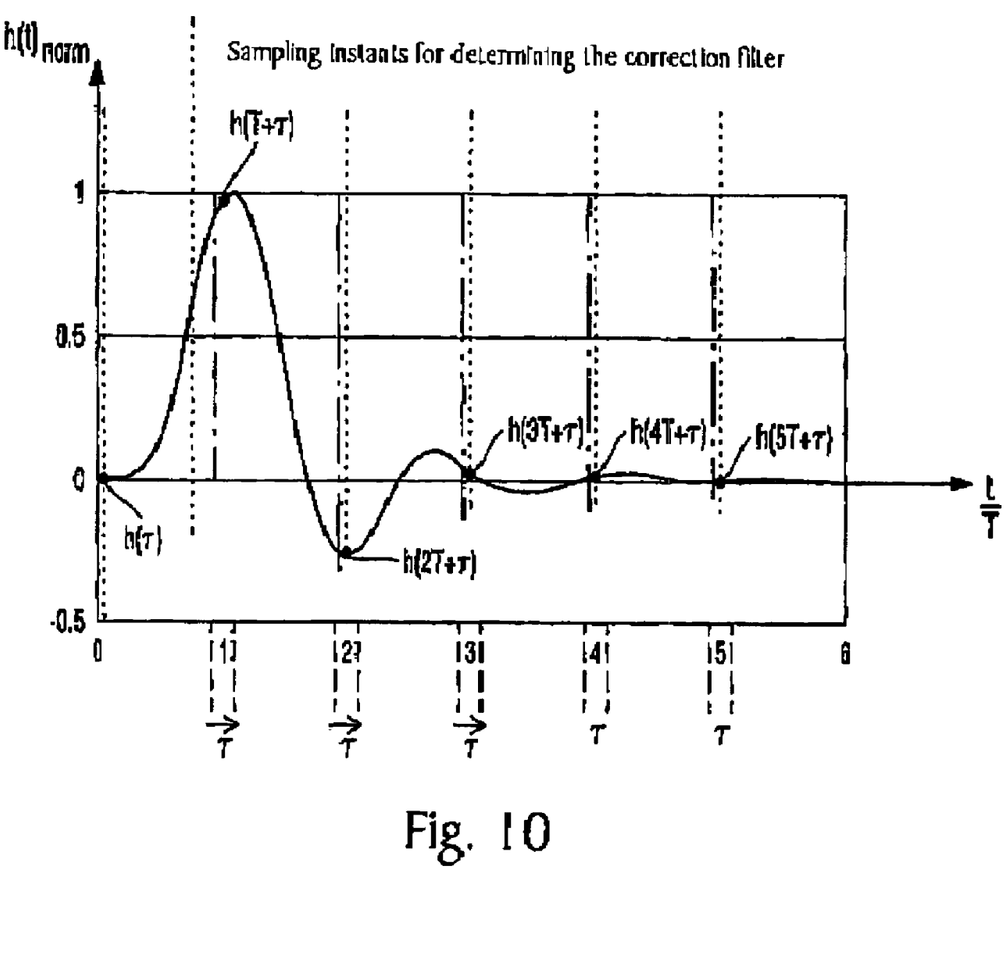
FIG. 10 shows a normalized pulse response of the transmission filter with the pulse response, illustrated in FIG. 8, for calculating the filter coefficients of a digital correction filter inside a digital precoding filter according to the invention.

For the most unfavorable sampling phase τ, the result for the transmission filter 6 in the case of the example illustrated in FIG. 10 is the following values:
0.001, 0.985, −0.267, 0.043, 0.013, 0.008

The following normalized values are yielded as normalized values by dividing by the maximum value 0.985:
0.001, 1.0, −0.271, 0.044, 0.013, 0.008

The normalized pulse response values h (τ+i×T), which follow the normalized maximum value 1, are adopted for the values of the pulse response g(k) of the correction filter inside the precoding filter 4.

The filter coefficients g(k) of the correction filter 39 therefore against themselves [sic] as:
−0.271, 0.044, 0.013, 0.008 . . .

in the case of the example illustrated in FIG. 10.

The reduction in the crest factor of the transmit output signal of the transmission filter 6 by the precoding filter according to the invention depends strongly on the filter characteristics of the transmission filter 6 and on the pulse response of the transmission filter 6. A reduction in the crest factor by approximately 2 dB can be achieved by means of the precoding filter 4 according to the invention in the case of the use of a transmission filter 6 with the pulse response illustrated in FIG. 8.

| List of reference numerals | |
|---|---|
| 1. | Transmitter |
| 2. | Data symbol source |
| 3. | Line |
| 4. | Precoding filter |
| 5. | Line |
| 6. | Transmission filter |
| 7. | Digital transmission filter |
| 8. | Line |
| 9. | Digital-to-analog converter |
| 10. | Line |
| 11. | Smoothing filter |
| 12. | Line |
| 13. | Power signal amplifier |
| 14. | Transmitter output |
| 15. | Precoding filter input |
| 16. | Line |
| 17. | Input |
| 18. | Adder |
| 19. | Output |
| 20. | Line |
| 21. | Input |
| 22. | Modulo adder |
| 23. | Input |
| 24. | Output |
| 25. | Line |
| 26. | Input |
| 27. | Subtracter |
| 28. | Output |
| 29. | Line |
| 30. | Input |
| 31. | Filter |
| 32. | Line |
| 33. | Branching node |
| 34. | Line |
| 35. | Input |
| 36. | Feedback filter |
| 37. | Line |
| 38. | Input |
| 39. | Correction filter |
| 40. | Line |
| 41. | Output |
| 42. | Output |
| 43. | Line |
| 44. | Output |
| 45. | Output |
| 46. | Line |
| 47. | Line |
| 48. | Line |
| 49. | Branching node |
| 50. | Line |
| 51. | Input |
| 52. | Line |
| 53. | Input |
| 54. | State memory |
| 55. | Memory |
| 56. | Multiplier |
| 57. | Line |
| 58. | Adder |
| 59. | Line |
| 60. | Memory |
| 61. | Multiplier |
| 62. | Line |
| 63. | Adder |
| 64. | Line |

What is claimed is:

1. Digital precoding filter for a transmission filter for minimizing the crest factor of the signal output by the transmission filter, having:

a) a modulo adder of the source data symbols which are received from a data symbol source at a signal input of the precoding filter, and added with fedback filtered transmission data symbols to transmission output data symbols which are output to the downstream transmission filter via a signal output of the precoding filter;

b) a digital feedback filter which filters the transmission output data symbols present at the signal output and feeds them back to the modulo adder; wherein c) a digital correction filter is connected to the signal output, the filter coefficients of the digital correction filter being set as a function of the pulse response of the transmission filter in the case of that sampling phase ($\tau$) for which the output signal of the transmission filter has a maximum value, d) an adder is provided which adds the signal present at the output of the correction filter to the received source data symbols, and e) a subtracter is provided which subtracts the signal present at the output of the correction filter from the signal output by the modulo adder.

2. Digital precoding filter according to claim 1, wherein the filter coefficients of the digital correction filter are set as a function of the pulse response of the transmission filter in the case of that sampling phase $\tau$ for which the output signal of the transmission filter has a maximum value.

3. Digital precoding filter according to claim 1, wherein connected downstream of the precoding filter is a transmission filter which comprises a digital transmission filter, a digital-to-analog converter and an analog smoothing filter.

4. Digital precoding filter according to claim 1, wherein connected downstream of the transmission filter is a line amplifier which transmits the transmission data output symbols in an amplified fashion via a transmission line to a receiver.

5. Digital precoding filter according to claim 1, wherein the source data symbols present at the signal input of the digital precoding filter are multi-level symbols.

6. Digital precoding filter according to claim 1, wherein the output signal values of the digital transmission filter lie within a predetermined value range.

7. Digital precoding filter according to claim 1, wherein the transmission filter is clocked with a sampling frequency ($f_a$) which is substantially higher than the symbol clock frequency ($f_T$).

8. Digital precoding filter according to claim 1, wherein the digital feedback filter and the digital correction filter have a common state memory which comprises a plurality of series-connected delay elements.

9. Digital precoding filter according to claim 1, wherein the digital feedback filter is a non-recursive digital filter.

10. Digital precoding filter according to claim 1, wherein the digital feedback filter is a Tomlinson filter.

11. Digital precoding filter according to claim 1, wherein the filter coefficients of the Tomlinson filter are set by the receiver as a function of the transmission characteristics of the transmission line.

12. A transmitter having:

a data symbol source for outputting source data symbols;

a digital precoding filter, which has a modulo adder which sums the source data symbols with fedback filtered transmission data symbols, and a digital feedback filter which filters the transmission data symbols present at a signal output of the precoding filter and feeds them back to the modulo adder, having a transmission filter which has a prescribed pulse response, and having a power signal amplifier which outputs the transmission data symbols output by the transmission filter in an amplified fashion to a transmission line,
there being connected to the signal output of the digital precoding filter a digital correction filter whose filter coefficients are set as a function of the pulse response of the transmission filter in the case of that sampling phase ($\tau$) for which the output signal of the transmission filter has a maximum value.

* * * * *